United States Patent [19]

Marmon

[11] 4,334,278

[45] Jun. 8, 1982

[54] SHOPPERS COUPON CALCULATOR

[76] Inventor: Robert A. Marmon, 339 N. Latches La., Merion Station, Pa. 19066

[21] Appl. No.: 147,002

[22] Filed: May 6, 1980

[51] Int. Cl.³ .............................................. G06F 15/20
[52] U.S. Cl. .................................... 364/709; 364/715; 364/464; 280/33.99 A
[58] Field of Search ............... 364/709, 715, 401, 464, 364/466, 200 MS File, 900 MS File; 280/33.99 A

[56] References Cited

U.S. PATENT DOCUMENTS

| | | | |
|---|---|---|---|
| 4,075,696 | 2/1978 | Shinoda et al. | 364/709 |
| 4,095,274 | 6/1978 | Gordon | 364/715 |
| 4,100,602 | 7/1978 | Shapiro | 364/715 |
| 4,115,870 | 9/1978 | Lowell | 364/709 |
| 4,192,006 | 3/1980 | Hausdorff | 364/464 |

Primary Examiner—Mark E. Nusbaum
Assistant Examiner—Gary Chin
Attorney, Agent, or Firm—Steele, Gould & Fried

[57] ABSTRACT

A hand-held apparatus is provided for determining the most economical purchase among products available in at least two sizes and at different prices, in conjunction with a price reduction product ("cents off") coupon. While requiring no knowledge of algebra or calculator functions of the user, the apparatus optimizes shoppers' decisions based on manual entry of product prices, sizes and coupon values. In preferred embodiments, not only is the optimum decision displayed, but further, the device may be used for accumulating total expenditures and may be used for incidental calculations.

11 Claims, 7 Drawing Figures

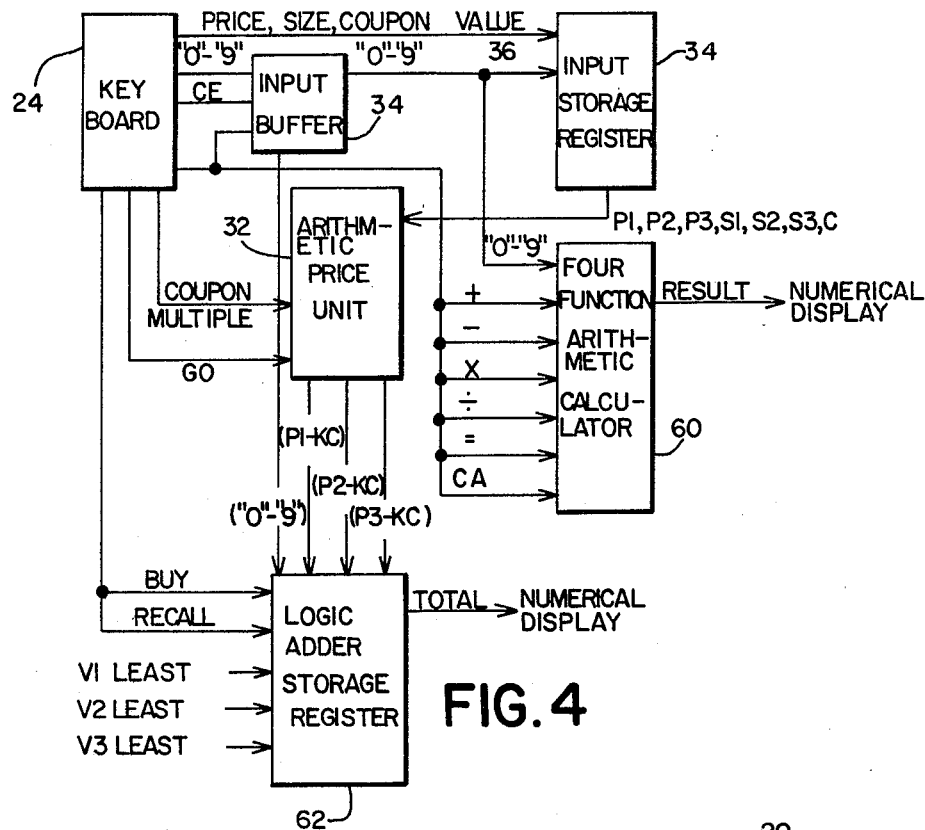
FIG. 4
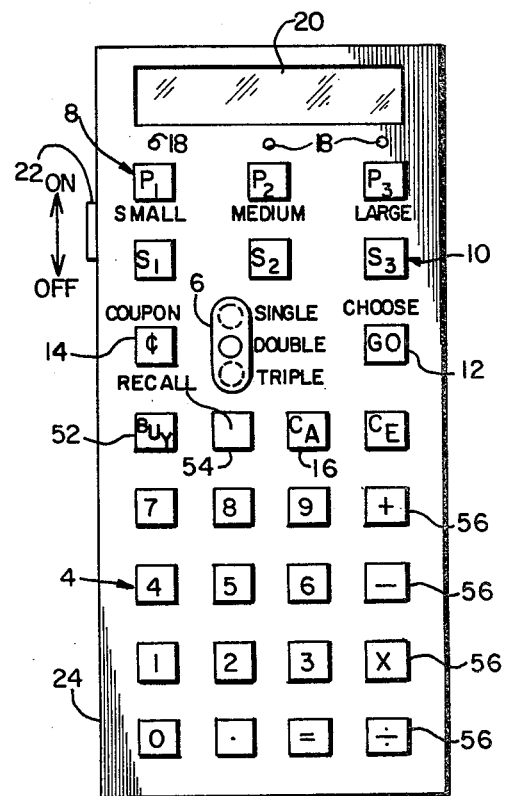
FIG. 3
| CONVERSION TABLE | | | | | |
|---|---|---|---|---|---|
| LB. | OZ. | GAL. | QT. | PT. | OZ. |
| 1 | 16 |  | 1/2 | 1 | 16 |
| 2 | 32 | 1/4 | 1 | 2 | 32 |
| 3 | 48 |  |  | 3 | 48 |
| 4 | 64 | 1/2 | 2 | 4 | 64 |
| 5 | 80 |  |  | 5 | 80 |
| 6 | 96 | 3/4 | 3 | 6 | 96 |
| 7 | 112 |  |  | 7 | 112 |
| 8 | 128 | 1 | 4 | 8 | 128 |
| 9 | 144 |  |  | 9 | 144 |
| 10 | 160 | 1 1/4 | 5 | 10 | 160 |
ALWAYS CONVERT TO SMALLEST UNIT SHOWN ON ANY LABEL
FIG. 5

SHOPPERS COUPON CALCULATOR

BACKGROUND OF THE INVENTION

1. Field of the Invention

The present invention relates to the field of shoppers' computing devices, and in particular, to hand-held computing devices for computing and accumulating price data from data manually entered by the shopper.

2. Description of the Prior Art

Prior art literature discloses a number of devices for computing a sale price. In various stages of sophistication, the prior art discloses a mechanical price computing mechanism (Kellogg—U.S. Pat. No. 2,716,520), electromechanical (Karp—U.S. Pat. No. 3,262,639) and electronic (Cousins, Jr.—U.S. Pat. No. 3,806,711). Such inventions typically compute sale prices based on entry of price per unit and number of units. Data entry is accomplished by automatic measuring devices (e.g. Newell—U.S. Pat. No. 4,039,805), by automatic tag-reading systems (e.g. Gogulski—U.S. Pat. No. ,4,071,740), and by manual key entry (e.g. Cousins, Jr.—U.S. Pat. No. 3,806,711).

Many of the prior art calculation devices are quite specialized and complex. Such specialization and complexity make many prior art devices not suitable for use by an ordinary consumer, for example, in a supermarket. Inasmuch as prior art units ae expensive and often bulky, the normal shopper will choose an unsophisticated device for use in such an environment.

Marketing strategies used by supermarkets and similar establishments have further complicated the consumer's problems. Although unit pricing schemes, sometimes required by law, tend to aid consumers making buying decisions, such systems become quite complicated when combined with product price reduction ("cents off") coupons. To further complicate the situation, retailers may redeem coupons at double or even triple their face amount, and not all products are quoted in unit prices based on identical units. Accordingly, there has been a need for a sophisticated yet simple to operate system particularly suited to supermarket shoppers. The present invention is intended to fill that need.

SUMMARY OF THE INVENTION

It is an object of the present invention to provide shoppers with a rapid, accurate tool for optimizing purchasing decisions affected by manufacturer's, store and other "cents off" coupons.

It is another object of the present invention to bring the benefits of innovative modern technology to the group consisting of all those who shop.

It is yet another object of this invention to provide the capability of sophisticated specialized calculations to shoppers without the requirement of substantial mathematical or computational skills.

These and other objects are accomplished by an apparatus for determining the most economical purchase among products available in at least two sizes, and at different prices, in conjunction with a "cents off" price reduction product coupon, comprising: means for storing numerical values corresponding to the product prices, the product sizes and the amount of the coupon; means for deducting the stored coupon value from each of the stored prices, providing adjusted prices; means for calculating price/size ratios corresponding to each of the adjusted prices and stored sizes; means for determining the smallest of the price/size ratios; and, means for displaying the outcome of the determination. In a preferred embodiment, coupon values may be increased by multiples, that is, double or triple value, and a running total of expenditures accumulated. The device is further capable of incidental mathematical calculations, as required by the user.

BRIEF DESCRIPTION OF THE DRAWINGS

For the purpose of illustrating the invention, there are shown in the drawings forms which are presently preferred, it being understood, however, that this invention is not limited to the precise arrangements and instrumentalities shown.

FIG. 3 is a top plan view of an intermediate model of the device, containing cumulative total and recall capability in addition to four function calculator capability.

FIG. 4 is a schematic diagram of the intermediate model shown in FIG. 3.

FIG. 5 is a conversion table for converting between common units, said table intended to be affixed to the back of the models shown in FIGS. 1 and 3.

DETAILED DESCRIPTION OF THE DRAWINGS

Figure 2:
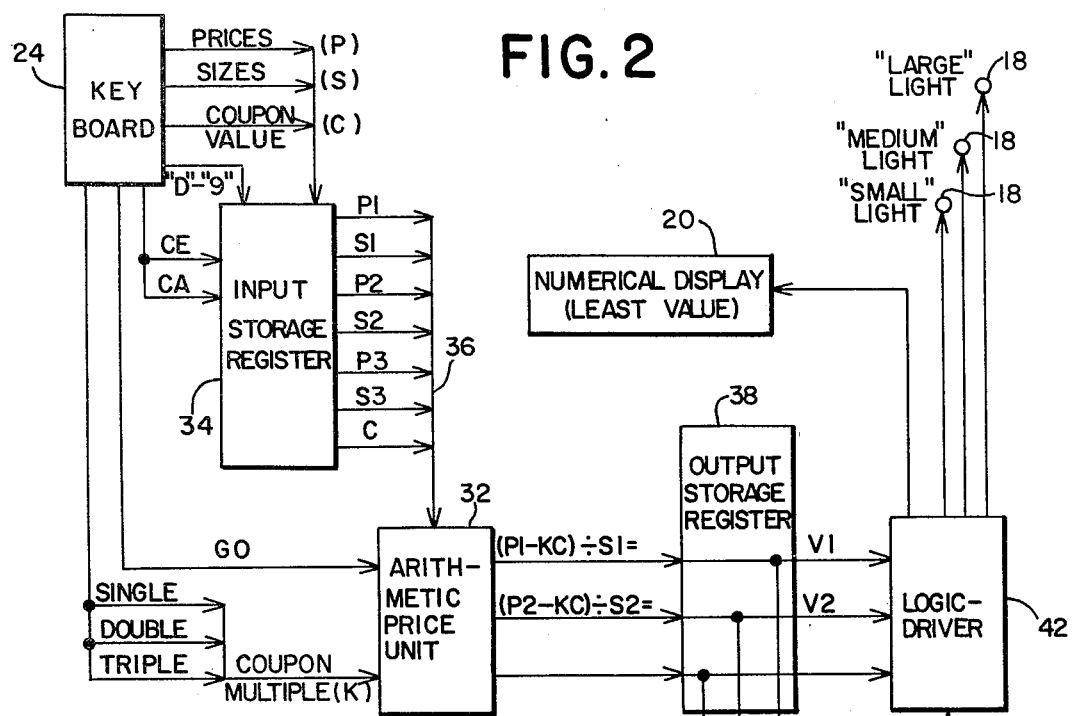
FIG. 2 is a schematic diagram of the embodiment shown in FIG. 1.
Figure 1:
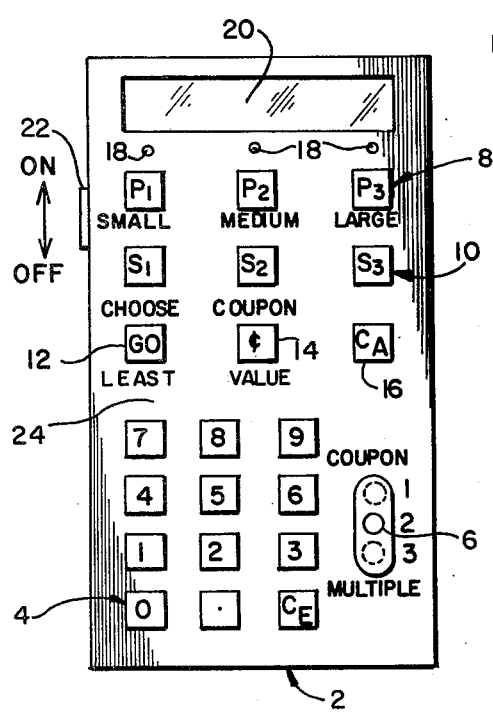
FIG. 1 is a top plan view of one embodiment of this invention, a basic model.

FIGS. 1 and 2 illustrate the basic model of this invention. FIG. 1 depicts the switches and displays as visible to the user. FIG. 2 illustrates the internal operation of the unit. It will be useful to first discuss the manner in which the user interacts with the keyboard of FIG. 1, proceeding thereafter to the internal operation.

With reference to FIG. 1, it is clear that basic model 2 appears quite similar to a normal calculator. A standard matrix of numeral pushbuttons 4 is provided, as well as a standard numeral display 20, and a power switch 22. Pushbutton matrix 4 is equipped with a standard decimal point entry pushbutton and a clear entry (CE) pushbutton. The entire unit may be cleared via a system clear (CA) 16. The remaining switches and indicators are peculiar to the present invention.

It is contemplated that a shopper at a grocery store is confronted with a choice affected by manufacturers' or stores' price reduction coupons ("cents off" coupons). The consumer is primarily concerned with getting the most product at the least price. The store may be running a special promotion to redeem the shopper's coupons at double or triple their face values. Some of the shopper's coupons are of substantial value relative to the value of the product.

The shopper initiates the device by turning on power switch 22 and clearing the system via pushbutton 16. The device may also be automatically cleared when turned on. Switch 6, having three possible positions, is set to reflect single, double or triple coupon value. The shopper is now ready to compare the possible purchases, as affected by the coupon.

When using the basic unit, it is necessary that the stored unit quantities be consistent, that is all ounces, all pounds, all quarts, all grams, etc. For example, if the smallest unit is ounces, the user must convert pounds to ounces and enter the quantity in ounces. The table shown in FIG. 5 simplifies this task. The user enters the price via numeral pushbuttons 4, then presses one of the three pushbuttons 8 to indicate entry of a price. The user next enters the size of the product in the least of the common units. After entering the size, the user presses one of the three size switches 10, corresponding to the price previously entered. The user then proceeds to the second choice, entering price and size, and if a third choice is available, proceeds then to the third price and size. Finally, the user enters the face value of the coupon, and presses coupon value pushbutton 14. The device now has all the information necessary to calculate the optimum choice, which it does in response to the "go" button 12.

Understanding the choice of the optimum purchase requires an understanding of coupon procedures and unit pricing techniques. Many supermarkets and merchants display unit prices for all sizes of products, whereby the shopper can readily determine which size offers the lowest cost per unit of product. Usually, but not always, the larger sizes have lower per unit prices. However, when the use of coupons is introduced, the tendency of larger sizes to have lower effective unit prices is often reversed. This phenomenon can cause the unwary shopper to lose a substantial proportion of the benefit of his coupons. An example will demonstrate how coupons affect the optimum choice of product.

Assume a shopper holds a $ 0.40 coupon for any size of a certain liquid detergent. Assume further that the supermarket is running a double coupon value promotion. The shopper finds that the per unit prices posted on the shelf are one gallon of detergent for $6.85 for a per unit price of $1.725/quart. A second choice is a one quart size for $1.95 for a per unit price of $1.95/quart. Given the effect of the $0.40 double coupon, the correct decision is to buy the smaller size at a resulting unit price of $1.15 per quart. The coupon applied to the larger size results in a unit cost of $1.5125 per quart. In this example, the proper decision resulted in a savings of nearly 24%.

If a third size of product is added to the decision, or where special prices on one or more of the choices are introduced, it must be appreciated that the calculation becomes even more cumbersome. The present invention allows the shopper to directly enter the price and size of each choice, using the lowest common units. The impact of the coupon is calculated and the optimum choice, i.e., the lowest unit price, is indicated to the user via status lights. With reference to FIG. 1, status lights 18 appearing immediately above the price entry pushbuttons 8 indicate the optimum choice. At the same time, a price/size ratio, corresponding to the smallest per unit price, may be displayed on display 20.

FIG. 2 illustrates the operation of the system. Keyboard 24 is used by the shopper to enter data reflecting prices (P), sizes (S), coupon value (C), coupon multiple (K) and "go" command. As shown in FIG. 2, price, size and coupon value indication, and the numerical code associated therewith, are conveyed to input storage register 34. Although the numerical data is shown in FIG. 2 as a single signal line, it may be appreciated that the numerical data may be conveyed in either parallel or serial form, as is known in the art. The status indications from pushbuttons 8, 10 and 14 of FIG. 1 allow the input storage register to store data in the appropriate input buffers. Upon receipt of the "go" signal, arithmetic unit 32 processes the data from input storage register 34, as well as the indication of single, double or triple coupon value provided via switch 6 on keyboard 24. Arithmetic price unit 32 calculates the unit price of each alternative combination of price and size, as affected by coupon value (C) and coupon multiple (K). As shown in FIG. 2, the per unit price (V) is calculated by the formula: $(P-KC)/S=V$. Output storage register 38 stores the results of the computation, and presents the result for each alternative choice to the logic driver 42 and least value comparator 40. Least value comparator 40 compares the unit prices of each alternative purchase, and presents a status indication of the optimum buy to logic driver 42. Logic driver 42 then gates the unit price of the optimum choice onto numerical display 20, and drives the appropriate status indication light 18.

In certain instances, the unit price as calculated by arithmetic price unit 32, may be zero or even negative. In addition, there may be instances when less than three alternatives are available to the purchaser. Accordingly, the system must have the capability of indicating the validity of the data on each line. Some supermarkets will redeem the entire value of a coupon, as increased by the appropriate multiple. However, many supermarkets will only redeem coupons up to the value of the item actually purchased. Arithmetic price unit 32 can be programmed to present zero to the output storage register 38 in the event that the supermarket will redeem coupons only up to the amount of the purchase price. Alternatively, a further status indication switch (not shown) can be used to indicate to arithmetic price unit 32 whether coupon redemption may exceed purchase prices, allowing calculation of a negative per unit price.

Should less than three alternatives be available to the shopper, least value comparator 40 must ignore the data on those outputs of arithmetic price unit 32 which do not reflect value inputs. FIG. 2 indicates the preferred solution to this problem. Price data from input storage register 34 is presented to the least value comparator 40. Internal logic in least value comparator 40 disables any output that corresponds to an invalid price input. For example, if the third price is not entered, P3 is zero, and the possiblity that the third alternative is optimum is precluded. It may be appreciated that the same result could be accomplished in other ways. For example, when the system is initiated, e.g. by completion of a cycle, by system clear 16 or by a power-up reset, input storage register 34 could be loaded with very high price numbers. Another possiblity, would be to have arithmetic price unit 32 output a very high per unit price to output storage register 38 whenever the size input is zero.

The apparatus of this system can be embodied in a number of different forms, which will now be clear to those skilled in the art. Arithmetic unit 32, storage registers 34, 38, comparator 40 and driver 42 can be combined into a single integrated circuit package, or can be included as separate packages. Numerical display 20 is preferably a liquid crystal display, to conserve power. Status lights 18 may also be included in the liquid crystal display. Where conservation of battery power is not a problem, display 20 and indicator lights 18 could also be light emitting diode displays, gas discharge displays, etc.

FIGS. 3 and 4 depict a system of intermediate complexity according to this invention. FIG. 3 shows the hand-held device of the invention. It may be noted that additional keys, for additional mathematical functions are provided. The system of FIGS. 3 and 4 corresponds to the basic system of FIGS. 1 and 2, except that the four arithmetic functions of a conventional calculator are provided, and a running total of purchases is automatically kept. The intermediate unit, indicated generally as 50, includes numerical keys 4, coupon multiple switch 6, price, size, coupon, clear (CE and CA) and "go" pushbuttons, 8, 10, 14, 16, and 12 respectively. Displays 18, 20 and power switch 22 are likewise provided. Unlike the basic unit of FIGS. 1 and 2, intermediate unit 50 allows a shopper to use the unit as a conventional calculator by use of arithmetic function pushbuttons 56. Moreover, after choosing the optimum alternative, as described above, the user may add the price of the chosen unit to a running total by pressing pushbutton 52. The running total may be displayed by pushing recall pushbutton 54.

With reference to FIG. 4, the internal electronics of intermediate unit 50 includes the same elements as basic unit 2, with certain additions. Four function arithmetic calculator 60 shares numerical display 20 with the outputs of logic adder storage register 62, and with the unit price output of the basic unit. The running total of purchases is displayed on display 20 when logic adder storage register 62 is selected by operation of buy pushbutton 52 or recall pushbutton 54. Four function arithmetic calculator 60 displays its result on numerical display 20 upon operation of the equals sign pushbutton. Least value comparator 40, output storage register 38, logic driver 42, and status lights 18 are not shown in FIG. 4, but are included in the unit in the same manner as depicted in FIG. 2. As is evident from the drawings, intermediate unit 50 may be used as a conventional calculator, may be used to accumulate a running total of purchases, or may be used to choose purchases based on the minimum price per unit of the product. Moreover, the use of logic adder storage register 62 is conjunction with arithmetic unit 32 allows accumulation of a running total to be accomplished at the same time prices are compared. The outputs of arithmetic price unit 32 in FIG. 4 are both the per unit price as depicted in FIG. 2, and the total price of the product purchased, as shown in FIG. 4. The accumulated price is seen to be the price marked on the product, decreased by the coupon value, said coupon value increased by the appropriate multiple.

Operation of logic adder storage register 62 presumes that the shopper will choose the item bearing the lowest per unit price as affected by the coupon. Indications from least value comparator 40 provide information to logic adder storage registers 62 as to the optimum economic buy. When the buy pushbutton 52 is operated, logic adder storage register 62 increments its total by the price of the item bearing the lowest effective per unit price. Should the shopper elect to purchase a product that is not the alternative having the lowest effective per unit price, the shopper must complete a comparison calculation, if desired, then re-enter the price and coupon value, if any, of the chosen item. In this manner, the shopper avoids incrementing logic adder storage register 62 by the effective price of the product not chosen. In the event items are purchased without coupons, or are purchased without an optimizing calculation, "buy" pushbutton 52 can be used to enter price information directly from the keyboard.

Inasmuch as both basic unit 2 and intermediate unit 50 require that the size of each alternative product be entered in the same units of measure, both basic unit 2 and intermediate unit 50 are advantageously provided with a conversion table, for example, as indicated in FIG. 5. The conversion table of FIG. 5 shows equivalent values in english units. The conversion table for metric units could also be advantageously provided. In either case, the conversion table is affixed to the back of basic unit or intermediate unit 50 for convenient use by the shopper. The table may be printed on the back of said units, or embossed thereon.

Figure 6:
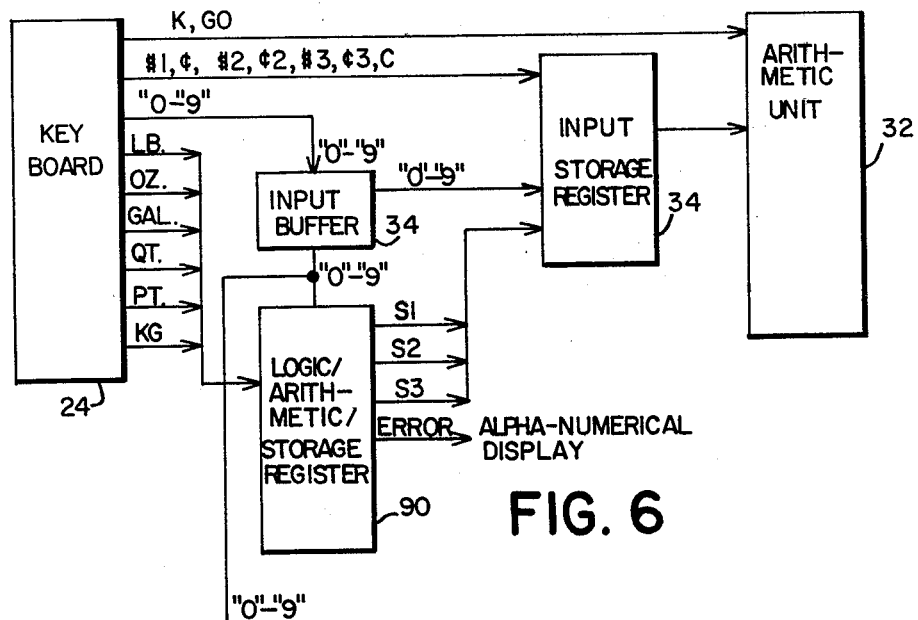
FIG. 6 is a schematic diagram of the preferred and most sophisticated model of this invention, containing variable price format input, direct unit entry, four function calculator and four key memory capability.
Figure 7:
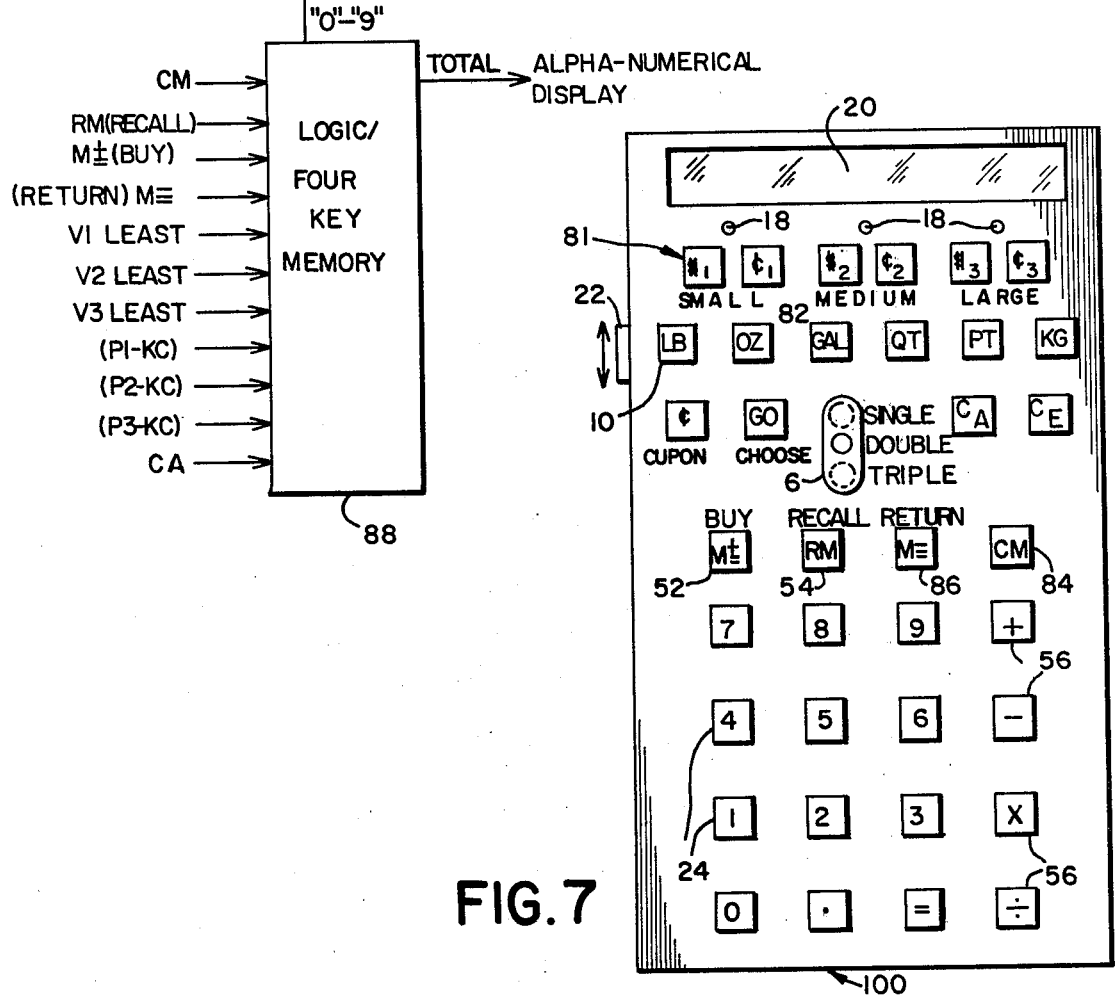
FIG. 7 is a top plan view of the model described in FIG. 6.

FIGS. 6 and 7 depict the most sophisticated embodiment of the present invention. The unit of FIGS. 6 and 7 is designed for maximum convenience, however, it will also probably be the most expensive of the possible units.

Sophisticated unit 100 employs many of the same elements as basic unit 2 and intermediate unit 50. Keyboard 24, coupon multiple switch 6, and displays 18, 20 are the same as the prior units. Like intermediate unit 50, sophisticated unit 100 can be used as a conventional calculator using arithmetic functions via, pushbuttons 56. Sophisticated unit 100 will also keep a running total, incrementing the total on operation of "buy" pushbutton 52, and displaying the total on operation of recall pushbutton 54. Unlike the prior units, sophisticated unit 100 contains a full four key internal memory feature. The shopper can add directly to memory (M $\pm$), substract directly from memory (M $\equiv$ ), recall the memory total (RM) or clear memory (CM) by operation of pushbuttons 52, 86, 54 and 84, respectively. When used for shopping, the running total of purchases is accumulated in the memory register. Thus, "buy" pushbutton 52 is the same as "add to memory." "Recall" pushbutton 54 is the same as "recall memory." "Substract from memory" pushbutton 86 can be used as a "return product" pushbutton. Finally, "clear memory" pushbutton 84 initializes the running total.

Sophisticated unit 100 has further conveniences for the shopper. Rather than single pushbuttons 8 for each of the three alternative purchases, sophisticated unit 100 has dollar pushbuttons 81 and cent pushbuttons 82 corresponding to each of the three alternative purchases. The user can enter prices using the dollar pushbutton 81 and cent pushbutton 82 for a single purchase, or can as desired, use only the dollar pushbutton in conjunction with the decimal point key on keyboard 24. Similarly, the shopper could enter more than one hundred cents to indicate more than one dollar. An additional convenience of sophisticated unit 100 relates to the entry of product quantities. Unlike basic unit 2 and intermediate unit 50, sophisticated unit 100 will calculate conversions from pounds to ounces, gallons to quarts, etc. Should the user attempt to compare the prices of non-comparable units, for example pounds and quarts, logic/arithmetic/storage register 90 will notify the shopper of his error on display 20. Display 20 of sophisticated unit 100 is an alpha numeric display, rather than a simple seven segment display.

The elements of basic unit 2 of FIGS. 1 and 2 are included in sophisticated unit 100. Although not pictured in FIG. 6, the least value comparator 40, logic driver 42 and output storage register 38 are all included in the sophisticated unit. As shown in FIG. 6, sophisticated unit 100 employs a four key memory element 88, and provides error signals as generated by logic/arithmetic/storage register 90. It is contemplated that the error signal of register 90 will be generated in conventional situations, such as dividing by zero, as well as in the particular situation of a shopper. Thus, an error will be generated for comparison of non-comparable units of measure, for entry of fractional cents, for entry of negative prices or coupon values, etc.

The various embodiments of this invention may be preferably constructed from integrated circuits, which are currently available to perform all of the functions described herein. It is also contemplated that most or all of the "logic" requirements for this invention can be designed into a single integrated circuit package, which is thought to provide the most economical manufacturing situation.

It should be understood that this invention is not limited to the precise elements, arrangements and instrumentalities shown. Variations on the present inventive concept will now be apparent to those skilled in the art. Accordingly, reference should be made to the appended claims, rather than the foregoing specification, as indicating the true scope of this invention.

I claim:

1. An apparatus for determining the most economical purchase among products available in at least two sizes, and at different prices, in conjunction with a price reduction product coupon, comprising:
   (a) a first register for storing numerical values corresponding to the product prices, the product sizes and the value of the coupon;
   (b) a keyboard for entering data corresponding to the numerical values;
   (c) means for deducting the stored coupon value from each of the stored prices, providing adjusted prices;
   (d) an arithmetic unit for calculating price/size ratios corresponding to each of the adjusted prices and the stored sizes, the unit providing a numerical ratio for each of the product sizes which reflects the price, less the coupon value, the difference divided by the corresponding product size;
   (e) a second register for storing the numerical ratios;
   (f) a value comparator for determining the smallest of the numerical ratios;
   (g) means for selecting the smallest numerical ratio as an output; and,
   (h) an indicator corresponding to each product size, one of which indicators displays the selected output of the value comparator.

2. The apparatus of claim 1, further comprising means for automatically increasing the stored coupon values by manually selecting a multiple of that value, prior to deduction of the coupon value from the stored prices.

3. The apparatus of claim 2, further comprising a manually activatible switch for selectively doubling and tripling the stored coupon value.

4. The apparatus of claim 1 or 2, wherein the smallest value ratio determination is made between three product sizes.

5. The apparatus of claim 1 or 2, wherein the arithmetic unit has at least one input connected to at least one output of the keyboard corresponding to a command signal for initiating calculation.

6. The apparatus of claim 5, wherein the value comparator includes means for distinguishing between numerical ratios greater than zero, numerical ratios less than zero, numerical ratios equal to zero and the absence of input data, the distinguishing means including a positive/negative sign detector.

7. The apparatus of claim 1, wherein the display means comprises an alpha numeric readout, which displays the numerical ratio corresponding to the selected output of the value comparator.

8. The apparatus of claim 1, 2 or 7, wherein the arithmetic unit further comprises means for adding the prices of the products corresponding to the selected numerical ratios, and for storing a cumulative total of all purchased products.

9. The apparatus of claim 8, further comprising means operatively connected to said arithmetic unit for enabling user-generated adjustments to the cumulative total.

10. The apparatus of claim 1 or 2, wherein the value comparator includes means for distinguishing between numerical ratios greater than zero, numerical ratios less than zero, numerical ratios equal to zero and the absence of input data.

11. The apparatus of claim 10, wherein the value comparator includes a positive/negative sign detector.

* * * * *